(12) United States Patent
Mangiapane

(10) Patent No.: US 7,363,852 B2
(45) Date of Patent: Apr. 29, 2008

(54) MULTIPLE BEVERAGE PREPARATION DEVICE

(76) Inventor: Joseph Mangiapane, 224 Grassmere Ave., Oakdale, NY (US) 11769

( * ) Notice: Subject to any disclaimer, the term of this patent is extended or adjusted under 35 U.S.C. 154(b) by 374 days.

(21) Appl. No.: 10/835,626

(22) Filed: Apr. 30, 2004

(65) Prior Publication Data

US 2004/0200364 A1    Oct. 14, 2004

Related U.S. Application Data

(63) Continuation-in-part of application No. 10/128,914, filed on Apr. 24, 2002, now Pat. No. 6,729,226.

(60) Provisional application No. 60/497,408, filed on Aug. 22, 2003.

(51) Int. Cl.
*A47J 31/00* (2006.01)
*A47J 31/24* (2006.01)

(52) U.S. Cl. ............................ 99/291; 99/306; 99/318; 99/323; 222/144

(58) Field of Classification Search .................. 99/298, 99/291, 295, 323, 306, 318, 279; 426/79, 426/82; 210/323.1, 323.2, 455, 484; 222/144
See application file for complete search history.

(56) References Cited

U.S. PATENT DOCUMENTS

| 618,219 | A | * | 1/1899 | Bell ............................ 222/144 |
| 949,944 | A | * | 2/1910 | O'Connell .................... 222/144 |
| 1,357,445 | A | * | 11/1920 | De Mattei ..................... 99/291 |
| 1,431,603 | A | * | 10/1922 | Sprague, Jr. .................. 99/298 |
| 1,910,262 | A | * | 5/1933 | Schoenfeld ..................... 22/113 |
| 3,291,034 | A | * | 12/1966 | Sohn et al. ..................... 99/291 |
| 3,345,935 | A | * | 10/1967 | Waline ......................... 99/295 |
| 4,421,014 | A | | 12/1983 | Vicker |
| 4,941,399 | A | | 7/1990 | Zucchetti |
| 4,944,217 | A | | 7/1990 | Watanabe |
| 5,134,924 | A | | 8/1992 | Vicker |
| 5,490,447 | A | | 2/1996 | Giuliano |
| 6,161,470 | A | * | 12/2000 | Justus ......................... 99/319 |
| 6,360,650 | B1 | | 3/2002 | Mangiapane |
| 6,729,226 | B2 | | 5/2004 | Mangiapane |

FOREIGN PATENT DOCUMENTS

DE            39 35 384 A1    5/1991

* cited by examiner

Primary Examiner—Reginald L. Alexander
(74) Attorney, Agent, or Firm—Collard & Roe, P.C.

(57) ABSTRACT

A liquid dispenser device that is insertable into and removable from a main housing that can be used to dispense a liquid. The types of liquids that can be dispensed from this housing are for example, coffee, tea or other types of flavored drinks. This dispenser device can comprise a housing having a plurality of chambers disposed within this housing wherein each of the plurality of chambers are separated from each other by at least one partition. This device also includes a plurality of spouts coupled to the housing. This spout is in fluid communication with at least one of the plurality of chambers to form a conduit for allowing a fluid to pass from each of the plurality of chambers through the plurality of spouts and out of the housing.

19 Claims, 4 Drawing Sheets

MULTIPLE BEVERAGE PREPARATION DEVICE

CROSS REFERENCE TO RELATED APPLICATIONS

This application is a continuation-in-part application and claims priority of U.S. patent application Ser. No. 10/128,914 filed on Apr. 24, 2002, now U.S. Pat. No. 6,729,226 of which priority is claimed under 35 U.S.C. 120. In addition the applicant also claims priority under 35 U.S.C. 119(e) from U.S. Provisional Application Ser. No. 60/497,408 filed on Aug. 22, 2003.

BACKGROUND OF THE INVENTION

The invention relates to a coffee cup dispensing assembly for dispensing a cup of coffee to a user. More particularly, the invention relates to a coffee dispenser that allows different types of coffee or other flavored beverages to be inserted therein. In addition the disclosure of patent application Ser. No. 10/128,914 is hereby incorporated herein by reference.

SUMMARY OF THE INVENTION

The invention relates to a liquid dispenser device that is insertable into and removable from a main housing that can be used to dispense a liquid. The types of liquids that can be dispensed from this housing are for example, coffee, tea or other types of flavored drinks. This dispenser device can comprise a housing having a plurality of chambers disposed within the main housing wherein each of the plurality of chambers are separated from each other by at least one partition. This device also includes a plurality of spouts coupled to the housing. These spouts are in fluid communication with at least one of the plurality of chambers to form a conduit for allowing a fluid to pass from each of the plurality of chambers through the plurality of spouts and out of the housing.

The housing has an upper rim that can include at least one corrugated section and at least one flat section. The corrugated section provides a user with a greater grip on that section of the housing while the flat section allows the user to place indicia such as writing on housing section. The indicia can be in the form of a label that indicates the type of coffee that would be disposed in a corresponding chamber. These flat sections and corrugated sections can be disposed on the housing in an alternating manner.

In at least one embodiment, the housing is in a substantially cylindrical shape and has a top face and a bottom face and wherein the plurality of spouts extend out from the bottom face of the housing.

The housing can have a central region and a pivot hole disposed in a central region, wherein when the housing is inserted into the main housing of the liquid dispenser, the housing rotates about an axis formed coaxially with the pivot hole.

In at least one embodiment, the chambers are substantially trapezoidal in shape.

The chambers can be designed to receive least one filter holder that is insertable into and removable from at least one of the chambers. This filter holder can have a body section with a plurality of holes. This at least one filter holder can also further comprise a tab coupled to, and extending out from the body section. The tab is designed to allow a user to grip each of these filter holders to be easily removed from the chambers. This tab can be received in notches in the housing wherein each notch can be associated with at least one corresponding chamber. This design allows the filter holder to snugly fit into the housing. The tab can then extend beyond these notches to a peripheral region on the housing so that a user can easily grip one of the tabs and lift the filter holder out of the housing while it is sitting in one of the chambers.

This filter holder can be designed to have a body section that is elongated and wherein this body section can have a first substantially open end and a second substantially closed end. This body section can be formed in a tapered manner wherein the first substantially open end has a larger cross-section than the second substantially closed end so that each of the filter holder body sections are stackable one inside of the other.

This device can also include at least one basket which can be selectively coupled to the main body of the liquid dispenser, wherein the at least one basket is adapted to receive the housing.

This basket can be substantially cylindrically shaped and further comprise a tab coupled to the basket and extending out from this basket. To couple the basket to the main body there is at least one hinge coupled to the substantially cylindrical body section of the basket. This hinge connects to the main body and allows the basket to swing out open from the main body. One of the benefits of this design is that with the spout being in fluid communication with the chamber, fluid from that chamber only flows out of that spout and not any other spout which keeps the different flavored drinks separate from each other. If these drinks mix, then it is possible for the flavor of these final products to be altered.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
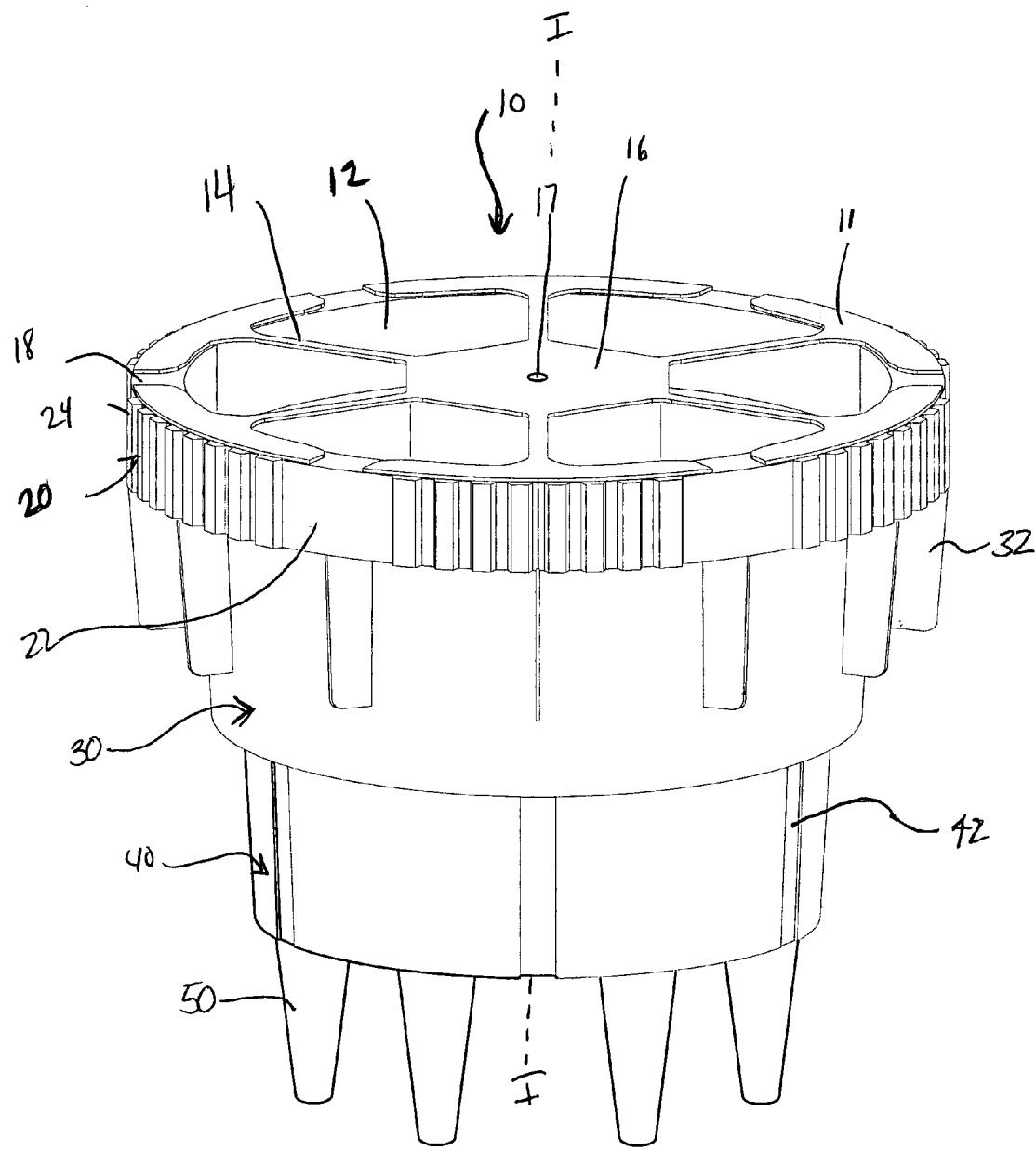
FIG. 1 is a perspective view of the housing associated with a device for dispensing liquids.

Turning now in detail to the drawings, FIG. 1 shows a perspective view of the device wherein there is shown a housing 10 having a plurality of chambers 12 separated by a plurality of radially extending partitions. Housing 10 is substantially cylindrical, and has a central region 16 which forms a hub, with partitions 14 radiating out therefrom. A central hole 17 is in central region 16 wherein central hole 17 allows housing 10 to rotate around an axis inside of a main housing such as a coffee maker housing.

Housing 10 has a plurality of notches or slots 18 associated with each of said chambers 12. In addition, housing 10 can be divided up into up to four different regions, a first region 20, a second region 30 and a third region 40 and a fourth region forming spouts 50.

First region 20 includes at least two different sections a first section which is a flat region 22 and a second section which is a corrugated region 24. Corrugated region 24 is for allowing a user to easily grip housing 10 and to allow housing 10 to spin or rotate around a central axis formed by hole 17. Flat region 22 is for allowing the presentation of indicia such as a label to indicate the type of concentrate disposed in chamber 12. Each flat region 22 is associated with a corresponding chamber 12.

In a next level, or second level 30 there are a plurality of spacer brackets or flanges 32 disposed annularly around this section. These flanges 32 are used to space housing 10 from an adjacent wall inside of a basket 70 (See FIG. 4). Level 30 is smaller in diameter than first level 20, and thus forms a narrower region of housing 10.

The next or third level 40 is even more narrow or smaller in diameter than level 30. This level 40 has a plurality of notches 42 spaced annularly around this level. Finally the fourth level 50 includes a plurality of spouts extending out from a bottom or second face of housing 10. Housing 10 essentially includes a first face 11 which has open ends of chambers 12 and a second face (not shown) which is substantially closed with the exception of spouts 50 extending out therefrom.

Figure 2:
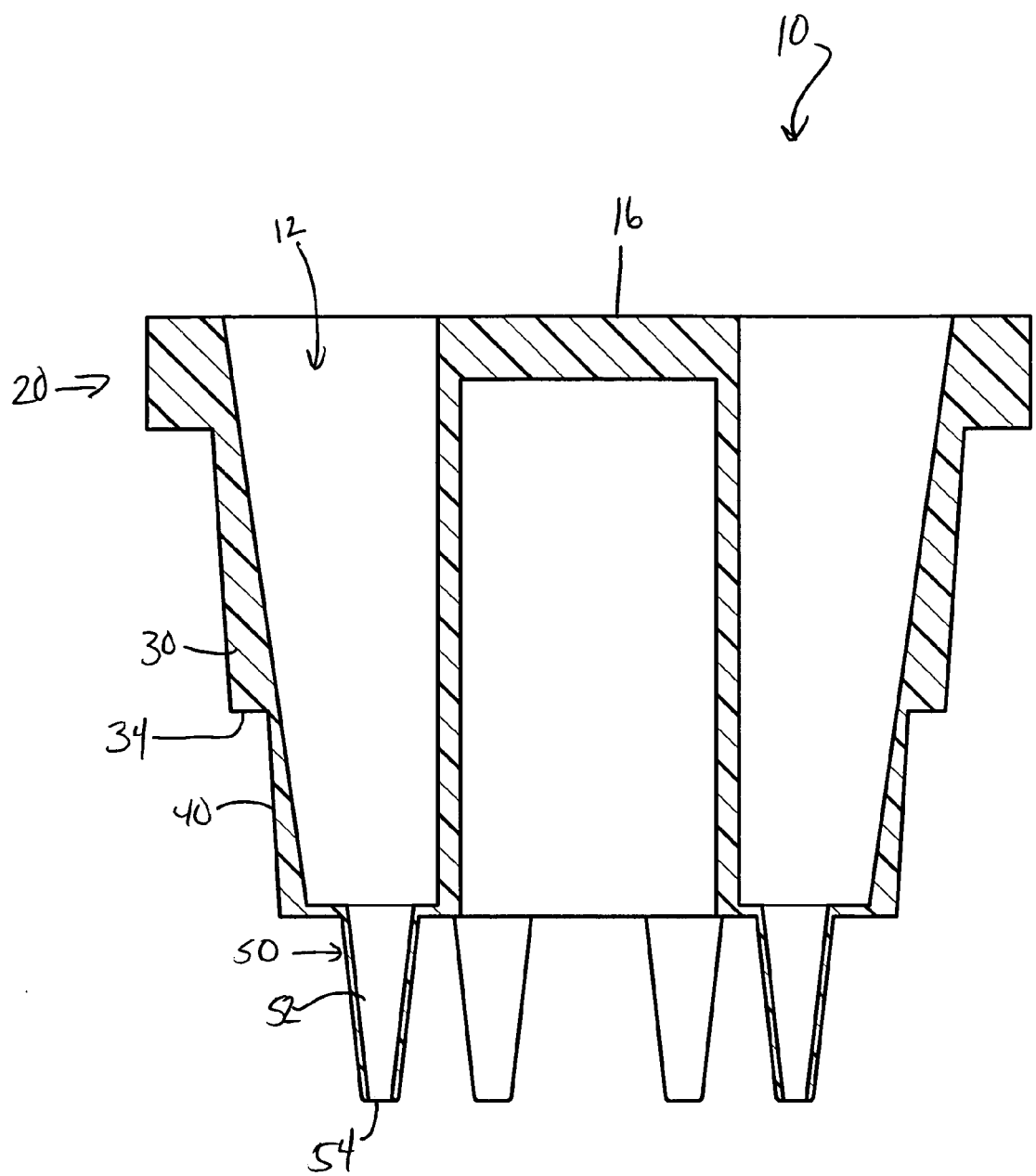
FIG. 2 is a cross-sectional view of the housing shown in FIG. 1 along line I-I.

As shown in FIG. 2, spouts 50 have a hollow section 52 which is in fluid communication with chamber 12. Spout 50 also has an open end 54 which allows fluid to flow out therefrom.

Figure 3:
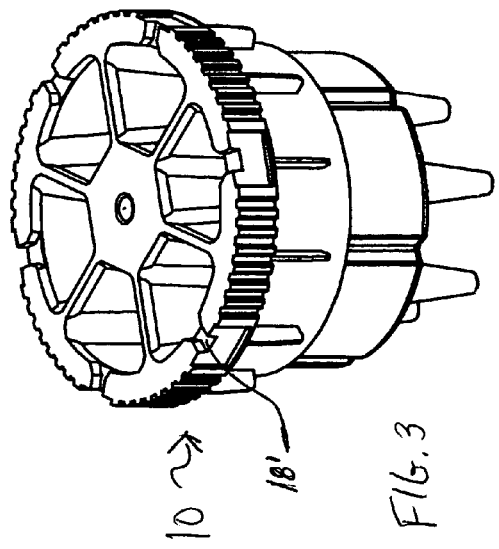
FIG. 3 is a perspective view of a second embodiment of the housing.

FIG. 3 shows a perspective view of another embodiment of the invention wherein in this view, notches 18' are much deeper than notches 18 shown in FIG. 1.

Figure 4:
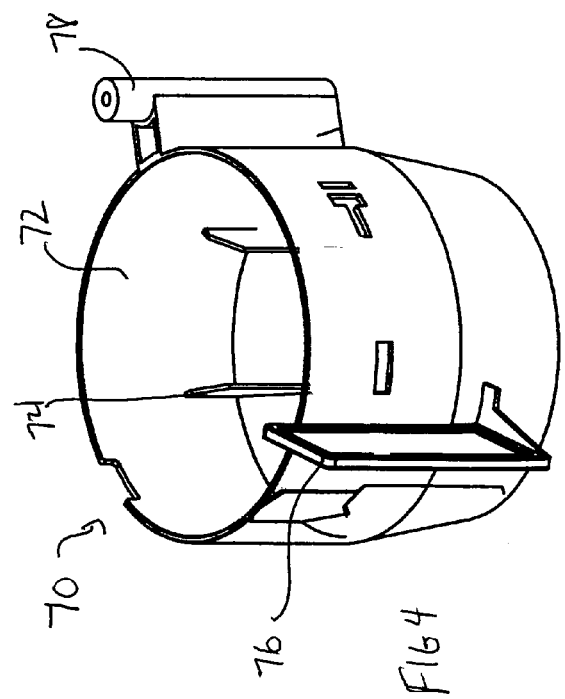
FIG. 4 is a perspective view of a basket.

FIG. 4 shows a perspective view of a basket 70 which can be used to receive housing 10. Basket 70 includes a body section 72 that can be substantially cylindrical in shape and this basket has a plurality of interior flanges 74 for supporting housing 10 in basket 70. Flanges 74 allow basket 10 to rest on them, wherein a bottom face 34 of second section 30 rests upon flanges 74 allowing housing to rotate within basket 70. Basket 70 may also include a tab 76 coupled to, and extending out from basket 70.

Figure 5:
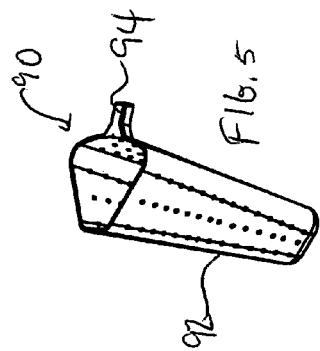
FIG. 5 is a perspective view of a first embodiment of a filter holder.

FIG. 5 shows a perspective view of a filter or filter holder 90. Filter holder 90 includes a filter holder body 92 and a flange or tab 94 extending out from filter holder body 92. Filter holder body 92 includes a plurality of holes which allow a fluid to flow therethrough. These filter holders 90 are insertable into, and removable from chambers 12 in housing 10. These filters/filter holders 90 can be used without actual filters because their holes are sufficiently small to allow fluid to flow therethrough without letting any of the concentrate material to flow therethrough.

Figure 6:
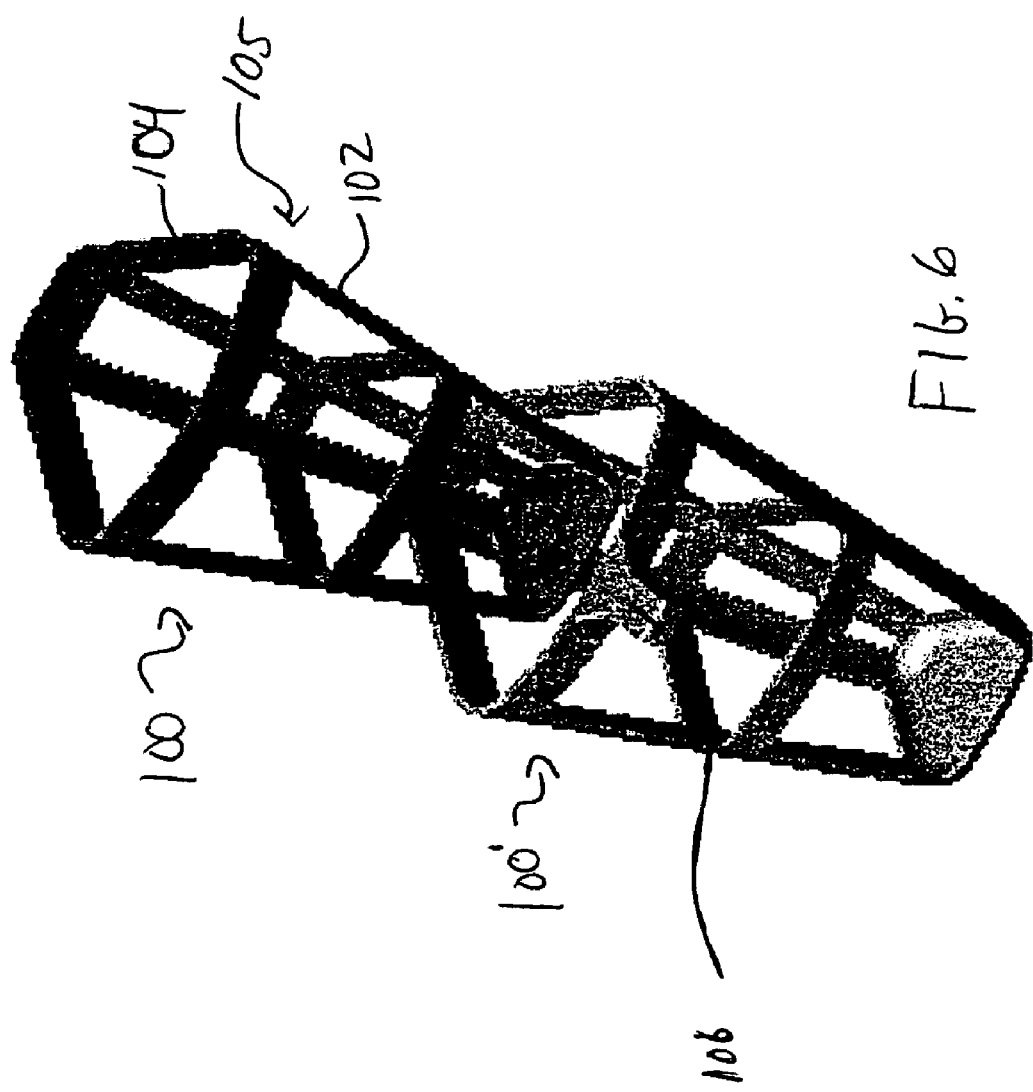
FIG. 6 is a perspective view of a second embodiment of the filter holder.

FIG. 6 shows another embodiment of filter holders wherein this second embodiment of filter holders includes a first filter holder 100 and a second filter holder 100'. These filter holders are made in a tapered form such that an open top end is wider than a substantially closed bottom end so that these filter holders are stackable. These filter holders 100 have larger holes than filers/filter holders 90 so that they include a first set of brackets 102 and a second set of brackets 104 that intersect each other to form a plurality of holes therein to allow fluid to flow therethrough.

These holders have tabs 106 which extend out from a body region 105 formed from brackets 102 and 104.

Filter holders 100, 100' are designed to receive individual filters that contain a flavored concentrate material such as coffee, tea or any other concentrate material. The filters can be in the form of open ended filters or a closed cartridge or bag like filters. These filter/filter holders 90, 100, 100' can be inserted into housing 10 such that each filter holder fits into one of chambers 12 with tab 94 on filter holder 90 or tab 106 on filter holder 100 sliding into notches or slots 18. These tabs can even extend slightly radially beyond notches or slots 18 so that a user can grab hold of these tabs and lift these filter holders out of housing 10.

When in use, basket 70 is coupled to a main housing (not shown) which may be in the form of a retrofitted coffee maker. Hinge 78 is coupled to this main housing so that basket 70 can swing out away from this main housing to open up a top open face to allow housing 10 to be placed therein. Filter/filter holder 90 can receive the concentrate itself, while filter holders 100, 100' can receive filters filled with concentrate material and then be inserted into housing 10 so that they slide into chambers 12. Because each chamber is separated by a flat partition 14, each one of chambers 12 can receive a different flavored concentrate material. Once all of chambers 12 have been filled with filter holders 90, 100 and 100', or once they have been sufficiently filled, basket 70 can be swung closed on hinge 78 so that housing 10 is completely inside of the main housing. In this position, housing 10 can be rotated within the main housing so that a particular chamber will line up with a liquid dispenser inside of the main housing. This liquid dispenser will release liquid into one of chambers 12 so that fluid will flow through chambers 12 down through spouts 50, out of holes 54 and into a cup or a mug. When another person wants to make himself or herself a cup, housing 10 can be rotated wherein a bottom face 34 of section 30 slides over flanges or supports 74 as housing 10 rotates. Another one of chambers 12 aligns with the liquid dispenser to receive this liquid and deliver the concentrate material and this liquid into a cup or a mug. In particular, fluid flows into chambers 12, and then out of chambers 12 and into the individually associated spout 52 and then out to a coffee cup.

Accordingly, while at least one embodiment of the present invention have been shown and described, it is to be understood that many changes and modifications may be made thereunto without departing from the spirit and scope of the invention as defined in the appended claims.

What is claimed is:

1. A dispenser device that is insertable into and removable from a basket, the device comprising:
   a) a housing having a plurality of chambers disposed within said housing wherein each of said plurality of chambers are separated from each other by at least one partition;
   b) a plurality of spouts coupled to said housing, wherein said plurality of spouts extend out from a face on said housing wherein at least one spout is in fluid communication with at least one of said plurality of chambers to form a conduit for allowing a fluid to pass from each of said plurality of chambers through said plurality of spouts and out of said housing;
   C) at least one spacing element disposed on an exterior surface of said housing said at least one spacing element for spacing said housing from the basket.

2. The device as in claim 1, wherein said housing further comprises at least one corrugated section and at least one flat section.

3. The device as in claim 2, wherein said at least one flat section comprises a plurality of flat sections and said at least one corrugated section comprises a plurality of corrugated sections, wherein said plurality of corrugated sections and said plurality of flat sections are disposed on said housing in an alternating manner.

4. The device as in claim 3, wherein each of said plurality of flat sections is disposed adjacent to a corresponding one of said plurality of chambers.

5. The device as in claim 1, wherein said housing is in a substantially cylindrical shape.

6. The device as in claim 1, wherein said housing has a top face and a bottom face and wherein said plurality of spouts extend out from said bottom face of said housing.

7. The device as in claim 1, wherein said housing has a central region and a pivot hole disposed in said central region, wherein when said housing is inserted into the basket, said housing rotates about an axis formed coaxially with said pivot hole.

8. The device as in claim 1, wherein said plurality of chambers are substantially trapezoidal in shape.

9. The device as in claim 1, further comprising at least one filter holder that is insertable into and removable from each of said plurality of chambers, said filter holder having a body section having a plurality of holes.

10. The device as in claim 9, wherein said at least one filter holder further comprises a tab coupled to and extending out from said body section.

11. The device as in claim 1, wherein said housing has a plurality of notches with each of said plurality of notches disposed adjacent to a corresponding each of said plurality of chambers.

12. The device as in claim 10, wherein said housing has a plurality of notches with each of said plurality of notches disposed adjacent to a corresponding each of said plurality of chambers, and wherein said tab on said at least one filter holder fits into at least one of said plurality of notches.

13. The device as in claim 1, wherein said filter holder body section is elongated and has a first substantially open end and a second substantially closed end.

14. The device as in claim 9, wherein said filter holder body section is formed as a tapered body section wherein said first substantially open end of said filter holder has a larger cross-section than said second substantially closed end so that each of said filter holder body sections are stackable one inside of the other.

15. The device as in claim 1, wherein the basket is adapted to receive said housing.

16. A dispenser device comprising:
a) a substantially cylindrical shaped housing having a plurality of chambers disposed within said housing wherein each of said plurality of chambers are separated from each other by at least one partition; and
b) a plurality of spouts coupled to said housing, wherein at least one spout is in fluid communication with at least one of said plurality of chambers to form a conduit for allowing a fluid to pass from each of said plurality of chambers through said plurality of spouts and out of said housing;
c) at least one basket, coupled to the main housing, wherein said housing is insertable into said basket and wherein said basket has a substantially cylindrical body section and further comprises at least one hinge coupled to said substantially cylindrical body section of said basket.

17. The device as in claim 16, wherein said at least one basket further comprises a tab coupled to said basket and extending out from the basket.

18. The device as in claim 17, wherein said basket has a substantially cylindrical body section and further comprises at least one hinge coupled to said substantially cylindrical body section of said basket wherein said hinge is for rotational coupling to another object.

19. A dispenser device comprising:
a) a housing having a plurality of chambers disposed within said housing wherein each of said plurality of chambers are separated from each other by at least one partition wherein said housing has a plurality of notches with each of said plurality of notches disposed adjacent to a corresponding each of said plurality of chambers;
b) a plurality of spouts coupled to said housing, wherein said plurality of spouts extend out from a face on said housing, wherein at least one spout is in fluid communication with at least one of said plurality of chambers to form a conduit for allowing a fluid to pass from each of said plurality of chambers through said plurality of spouts and out of said housing;
c) at least one filter holder that is insertable into and removable from each of said plurality of chambers, said filter holder having a body section having a plurality of holes, and a tab, and wherein said tab on said at least one filter holder fits into at least one of said plurality of notches on said housing.

* * * * *